UNITED STATES PATENT OFFICE.

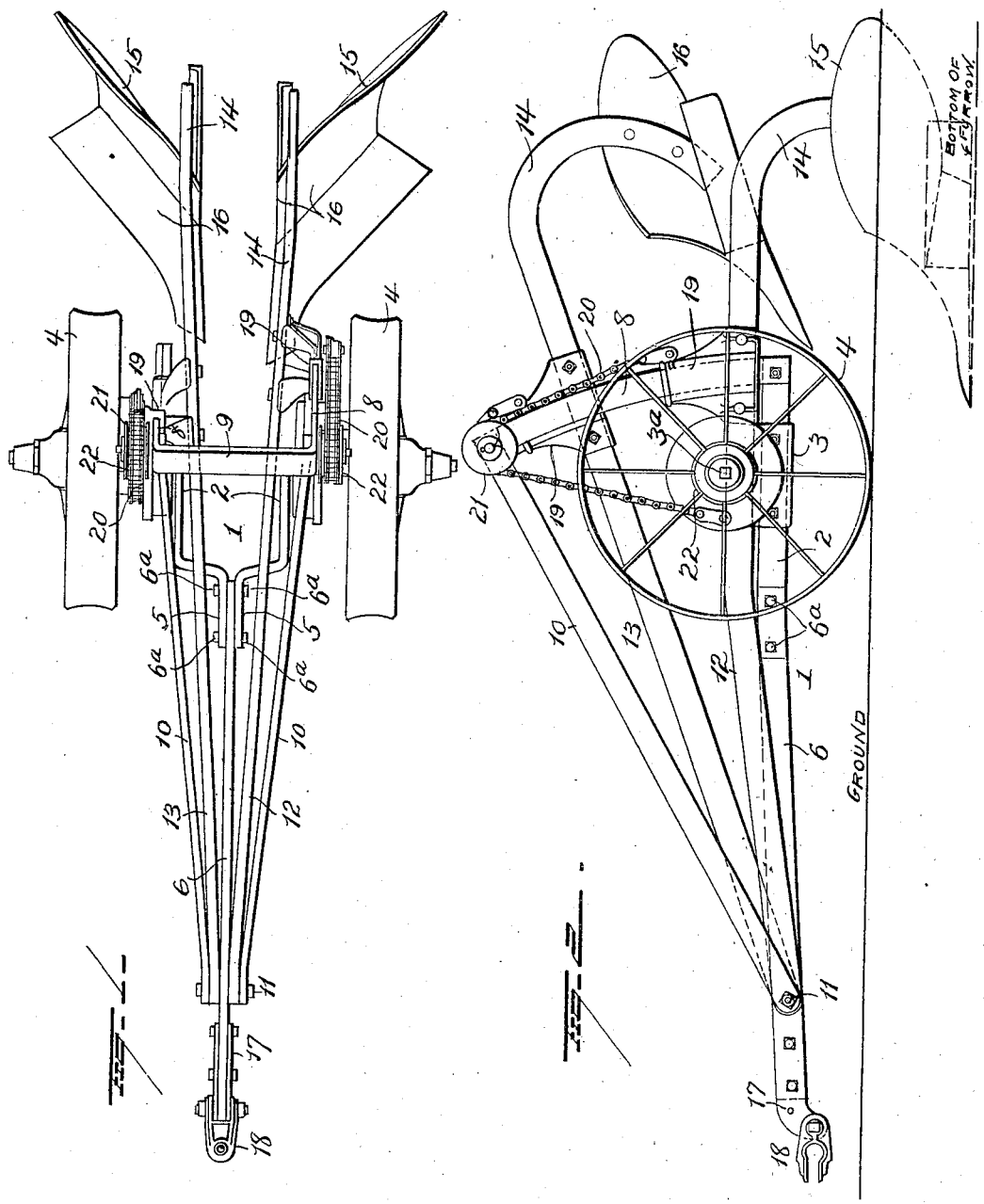

RUDOLPH J. ALTGELT, OF SOUTH BEND, INDIANA, ASSIGNOR TO OLIVER CHILLED PLOW WORKS, OF SOUTH BEND, INDIANA.

PLOW.

1,377,050.

Specification of Letters Patent. Patented May 3, 1921.

Original application filed March 17, 1920, Serial No. 366,617. Divided and this application filed July 15, 1920. Serial No. 396,538.

*To all whom it may concern:*

Be it known that I, RUDOLPH J. ALTGELT, a citizen of the United States, and a resident of South Bend, in the county of Saint Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows, and more particularly to frame construction for two-way plows,—this application being a division of application filed by me on the 17th day of March 1920 and designated by Serial No. 366,617.

One object of my present invention is to so construct a wheeled plow frame adapted for connection with a tractor, that its forward end shall be narrow, thus permitting the frame to be connected close to the tractor and still permit the turning of the tractor without conflict with said frame.

With this and other objects in view, the invention consists in certain novel features of construction and combinations of parts as hereinafter set forth and pointed out in the claims.

In the accompanying drawings; Figure 1 is a plan view of a plow showing an embodiment of my invention, and Fig. 2 is a side elevation.

1 represents a wheeled frame comprising comparatively short side members 2, 2, to which suitable brackets 3 are secured for the accommodation of fixed straight axle members 3ª for ground wheels 4, 4. The frame members 2, 2 are bent toward each other and terminate in parallel portions 5, 5, between which, the rear end of a central beam or frame member 6 is secured by means of bolts 6ª. The wheeled frame also includes an arch comprising upright curved or segmental bars 8 connected at their upper ends by a cross bar or member 9, and diagonal braces 10 connected at their rear ends to the upper portion of the arch and the forward ends of these brace bars are connected with the forward portion of the central frame beam 6, rearwardly of the forward extremity of the latter, by a bolt 11. Between the forward ends of the braces 10, the forward ends of plow beams 12, 13 are disposed and pivotally connected with the frame by means of the bolt 11,—the rear ends of said plow beams being provided with standard portions 14, 14, to which plow bases 15, 16 are secured, one being disposed reversely with respect to the other as is customary in two-way plows. The central frame beam 6 projects forwardly beyond the forward ends of the frame and of the plow beams and this forwardly projecting portion of the central frame beam constitutes a draw bar to which clevis members 17 are secured. To these clevis members a coupling yoke 18 may be pivotally attached for connecting the forward end of the wheeled frame with a tractor.

By constructing the wheeled frame as hereinbefore described and with the wheels near its rear end, the forwardly projecting portion of the frame is very narrow and thus close connection of said frame with a tractor is facilitated and danger of conflict of the tractor with the wheeled frame when the tractor is turned relatively thereto, is eliminated.

Elongated and slightly curved tubular guides 19 are secured to the divergent rear portions of the plow beams and are movable on the upright segmental bars 8 when one or the other plow beam is raised or lowered,—such connection of the plow beams with the frame also serving to retain said beams and the plow bases properly spaced.

Chains 20 are connected with the tubular guides 19 and, after passing over pulleys 21 at the juncture of the brace bars 10 with the guide bars 8, are extended downwardly and adapted to wind on drums 22,—the latter being adapted, by means of clutch mechanism, to be connected with the carrying wheels, as shown and described in my application for patent hereinbefore identified.

Having fully described my invention what I claim as new and desire to secure by Letters-Patent, is:—

1. In a plow structure, the combination of a rigid frame comprising a rear portion mounted on wheels and a central frame member rigidly secured to said rear portion and extending forwardly, devices at the forward end of said central frame member adapted for connection with a tractor, and plow beams pivotally connected near their forward ends to the central frame member of said rigid frame near the forward end of said frame member.

2. In a plow structure, the combination of a rear frame portion, wheels on which said rear frame portion is mounted, a central frame member secured to the rear frame portion and extending forwardly therefrom, upright members secured to the rear frame portion, brace members extending from said upright members to the forward portion of the central frame member and secured to the latter, and plow beams pivotally connected with the forward portions of the central frame members and the brace members.

In testimony whereof, I have signed this specification in the presence of two subscribing witnesses.

RUDOLPH J. ALTGELT.

Witnesses:
 ROSE B. MARBAUGH,
 T. C. CLINTON.